May 8, 1962 F. E. ELWOOD ET AL 3,033,689
METHOD OF MAKING MARGARINE
Filed Feb. 3, 1959 2 Sheets-Sheet 2
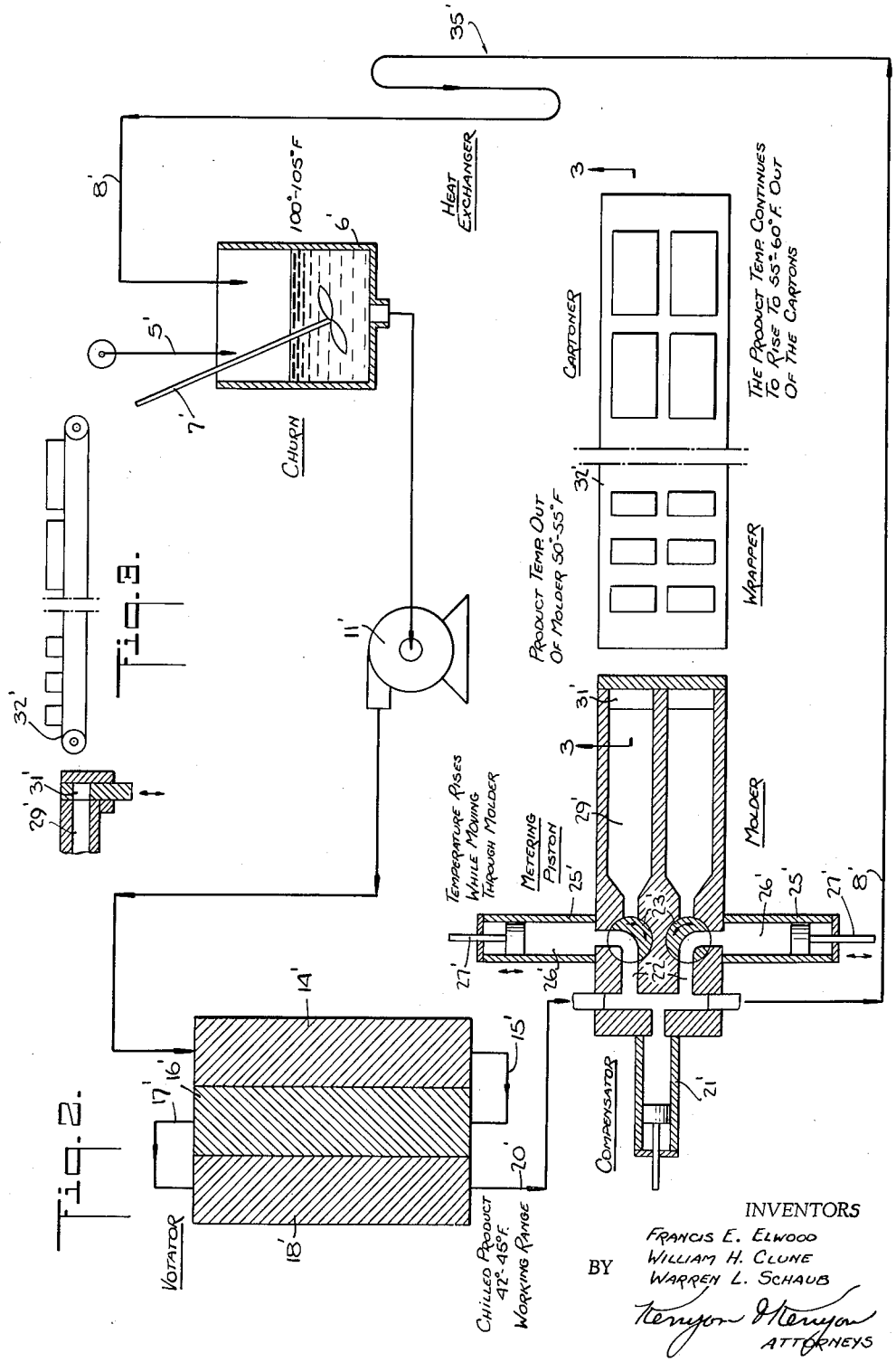
INVENTORS
FRANCIS E. ELWOOD
WILLIAM H. CLUNE
WARREN L. SCHAUB
BY
Kenyon & Kenyon
ATTORNEYS

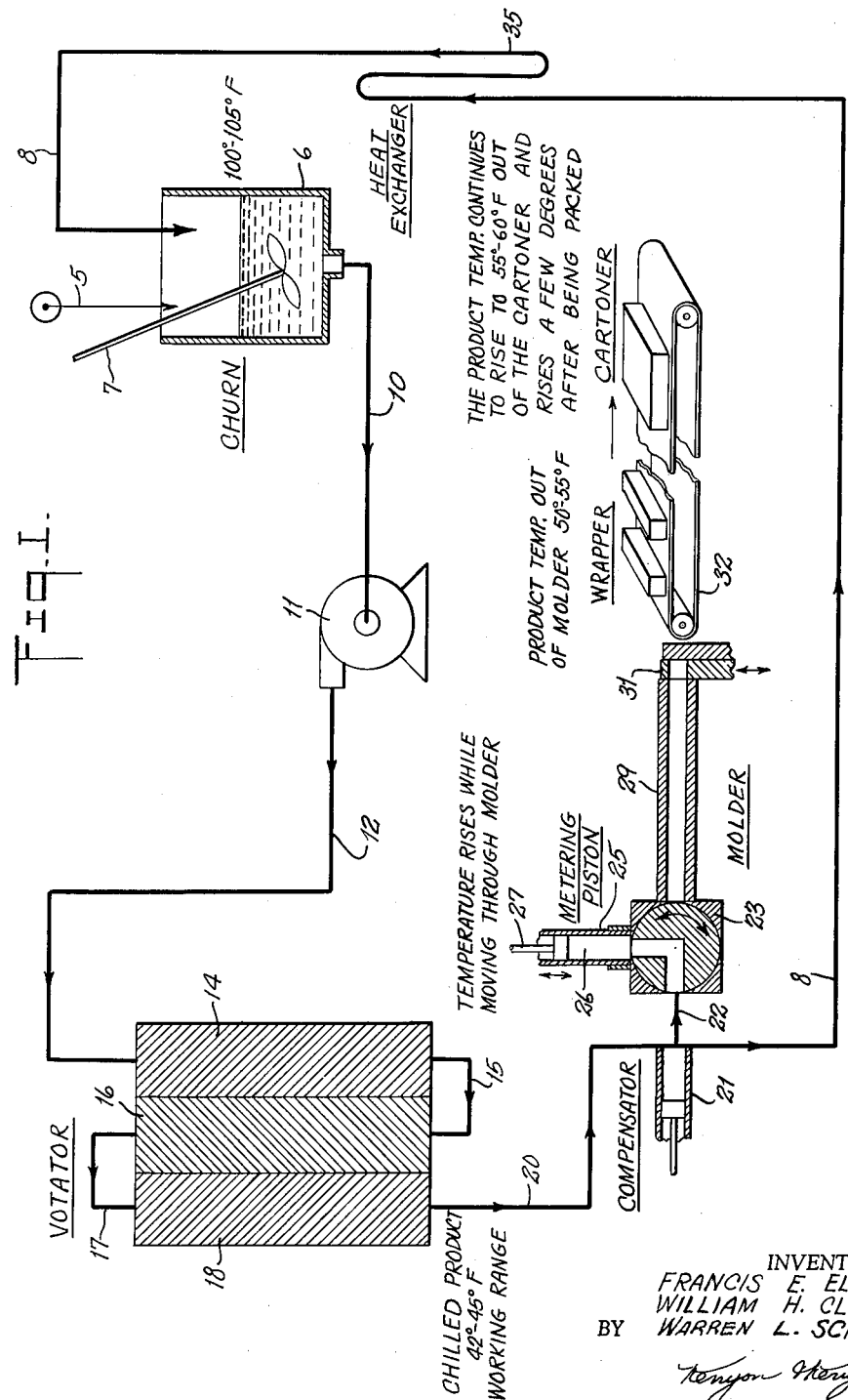

United States Patent Office 3,033,689
Patented May 8, 1962

3,033,689
METHOD OF MAKING MARGARINE
Francis E. Elwood, Mountainside, William H. Clune, Spring Lake, and Warren L. Schaub, Westfield, N.J., assignors to Corn Products Company, a corporation of Delaware
Filed Feb. 3, 1959, Ser. No. 790,881
8 Claims. (Cl. 99—122)

This invention relates to a method of producing margarine which has exceptionally fine grain, resistance to oiling off at ambient temperatures and excellent stripping characteristics on being removed from a wrapper.

In the conventional manufacture of margarine, a mixture of fat and skimmed milk is subjected to cooling and working in Votators or the like. The product of the Votators is allowed to solidify for a period of time during which titer heat is almost completely dissipated. The set-up product is then mechanically formed into a print and in the course of which the product is worked. The form of the final prints is obtained by forcing the solid mass of the worked margarine through an orifice of desired cross-section and then cutting the propelled mass to proper length. In all the steps of the operation following solidification of the margarine product, the margarine in its set-up form is worked to only a limited degree so that a firm print would still be obtainable.

We have found that a margarine product which had been worked in the solid state after the titer heat had been dissipated shows marked inferior characteristics because of non-uniformity in texture (mixture of soft and hard margarine within the same print), porosity (air pockets), and poor stripping from the wrapper (cohesive forces within the print not adequate to overcome adhesion to the wrapper) when compared with the product of the present invention.

It is an object of this invention to provide a method of producing margarine which has fine uniform texture, is free of air pockets, exhibits resistance to oiling off at ambient temperatures and shows excellent stripping characteristics in removing the margarine from the wrapper in which it is packaged.

Another object of this invention is to provide a method by which margarine can be easily processed once the emulsion has been chilled in conventional Votator units, said margarine requiring no tempering to attain uniformity in texture.

Other objects and advantages of this invention will become apparent from the following description and explanation thereof.

The present invention is concerned with a method of producing a print of solid margarine by passing liquid margarine to a solidification and molding zone having the same cross-sectional area as the final print for solidification. Thereafter the solidified margarine is discharged from the molding zone and cut into a print of desired size for subsequent packaging. An auxiliary feature of the process involves the use of a compensator or surge means which is situated in the feed line of liquid margarine flowing to the solidification and molding zone. The compensator provides surge capacity for the margarine feed when the flow to the molding zone is stopped. As soon as the flow to the metering zone is resumed the margarine in the compensator is discharged and combined with other margarine being charged thereto.

In a particular aspect of the invention, the liquid margarine flows to a metering zone prior to passing to the solidification and molding zone. In this arrangement, the metering zone is of a volume corresponding to that of the final print of margarine. It provides intermittent feeding of the liquid margarine to the solidification and molding zone and hence causes intermittent passage of solid margarine from the molding zone to the mold cavity of the packaging unit. By this intermittent flow of margarine, it is possible to synchronize the operation so that the mold cavity is in direct alignment with the solidification and molding zone as the former is being filled.

Without the intermittent flow of margarine, the solidified product would feed into the mold cavity before the latter was in proper position, with the consequence that the finished margarine would exhibit undesirable stratification and thus be significantly less attractive commercially. While other mechanical means may be employed to provide the intermittent flow, the metering zone has the exceptional advantage of delivering to the solidification and molding zone and hence to the molding cavity a measured volume of margarine, which permits better control of weight and losses and improved symmetrical appearance and texture of the finished product.

Margarine according to government regulation is produced by combining a milk phase with not less than 80% by weight of fat. Usually skim milk in quantity of about 15 to 20% by weight is present; and the fat usually of vegetable origin varies from about 80% to 82%. Common salt or sodium chloride may or may not be added; when added to margarine it is usually in an amount of up to 4%. Other optional ingredients include vitamins A and D, coloring, emulsifiers, preservatives, and flavoring agents. It will be recognized that margarine composition can be varied considerably for commercial purposes just so long as the final product is solid at room temperature (70°–80° F.) and possesses the desired organoleptic qualities. The improvement in the product of the present invention over that made according to conventional techniques exists irrespective of the variations in formulation indicated above. Indeed, the improvements noted are obtainable with margarines falling outside the government specification, viz., a margarine containing water in place of the skim milk.

The fat employed in the manufacture of margarine has a Wiley melting point of about 90 to 100° F., and more usually about 92 to 98° F. The setting point of the fat is about 70 to 80° F. and more usually 72 to 77° F.; the setting point is determined by the method described in U.S. Patent No. 2,047,530. In general, the fat has an iodine value (Wijs) of about 70 to 90, and more usually about 75 to 85. The fat is derived from the hydrogenation of one or more vegetable oils. In this connection the vegetable oil may be cottonseed oil, soya bean oil, corn oil and any other which meets the specifications mentioned herein. Such vegetable oils in a natural state are limpid, and consequently hydrogenation is necessary to change them to fats for use in margarines. The margarine fat may consist of two or more hydrogenated ingredients rather than a single component. In this connection it is usual to combine a highly hydrogenated solid fat with a lightly hydrogenated fat in order to extend the plasticity range of the margarine (more spreadable in the cold and still resistant to melting at room temperature). Whereas any conventional margarine fat may be employed for the present invention, the margarine fats of extended plasticity range are definitely preferred. However, other fats including those of animal origin or the so-called tropic vegetable fats may be used, provided they have melting and setting points in the ranges indicated above.

In the manufacture of margarine for our purposes, the fat ingredient, with the fat-soluble optional ingredients dissolved therein, is held at a temperature of about 100 to 130° F., preferably about 20° F. above the melting point of the fat and usually about 110 to 115° F. The melted fat is combined with the chilled pasteurized skim milk (the latter at about 35–45° F.) with or without common salt, and thoroughly mixed by suitable mechanical means such as a stirrer, etc. The liquid margarine emulsion at about 95 to 110° F. is fed to a series of Votator chilling A-unit cylinders to superchill the emulsion. The combination of Votator chilling A-unit cylinders may be varied considerably within the scope of the present invention. In one case, three conventional A-unit cylinders in series have been used. Each A-unit holds about 7 lbs. of the liquid margarine emulsion with the through-put rate being about 4000 to 7000 lbs. per hour. The superchilled product is reduced in temperature to about 25 to 35° F. below the setting point of the fat. Single or multiple A-units of different capacity may be used provided the through-put rate is such as to attain the desired degree of superchilling and subsequent titer heat rise. Pressure on the product is about 200 to 400 p.s.i.g. in pumping the emulsion to the A-units. The temperature of the superchilled product will be about 35 to 55° F. and more usually 41 to 47° F. There occurs an immediate temperature rise due to dissipation of titer heat as the fat in the produce, metered as a flowable gel, begins to set up first in the solidification and molding zone and progressively thereafter during expulsion from the mold cavity of the packaging unit, wrapping and cartoning. The overall titer heat rise is about 15 to 30° F. Of this overall temperature rise, generally at least about 5° F. and usually about 10° F. occurs in the molding zone and the remainder occurs thereafter. Stated another way, product temperature is about 40 to 65° F. as it leaves the molding zone and final product temperature is about 50 to 80° F. These increases in temperature of the product are in sharp contrast to the negligible titer heat rise (less than 2° F.) when the set-up solid margarine made by the conventional method is propelled into the mold capity of the packaging machine and wrapped; final product temperature, however, of the conventional product is about the same as that of the products of the present invention.

Following the superchilling of the liquid margarine, the product preferably enters a metering zone. The flow of liquid margarine is continuous but since prints are produced intermittently, at this stage of the method the metering zone is alternately in communication with the source of margarine and with the solidification and molding zone which is to be described more fully below. The metering zone is of predetermined size to deliver the proper volume of margarine to the solidification and molding zone and hence to the mold cavity of the packaging machine; a very slight excess is preferably delivered to assure expulsion of air from the mold cavity and hence proper weight control.

The liquid margarine flows from its source to the metering zone by means of a three-way two-part valve, hereinafter referred to as the two-way valve. The two-way valve reciprocates to accommodate the intermittent flow of margarine first from the source to the metering zone, and then from the latter to the molding zone. As regards the means for accomplishing this result, the metering zone may comprise a piston-cylinder combination, which as in the case of the two-way valve, reciprocates in unison with the action of the two-way valve in creating the intermittent flow of liquid margarine from the metering zone to the molding zone. In terms of apparatus, as the metering piston is being pulled out margarine flows into the cylinder. When the metering cylinder is filled to capacity, the two-way valve changes in position and the piston moves inwardly, thus forcing liquid margarine to flow into the molding zone. The mechanical means by which the piston and the two-way valve are made to reciprocate would be understood by those skilled in the art and so it requires no further elaboration here.

The molding zone consists of an elongated passage which may be surrounded by a jacket in which is maintained a flow of warm water. The cross-section of this molder is of the same shape as the final print. Preferably the molder is rectangular in cross-section. The residence time in this zone is dependent upon the time it requires to achieve substantial solidification of the liquid margarine. At the point of discharge from the molding zone, the margarine print should be sufficiently firm to be packaged or handled without damage. Since the quantity of margarine being forced from the molding zone corresponds approximately to the amount of margarine being forced from the metering zone, an intermittent production of packaged prints is established by cleaving the projecting end of solid margarine from the end of the molder and wrapping the same.

As mentioned, in the molding zone liquid margarine solidifies sufficiently to permit handling or wrapping. The super-chilled liquid margarine enters the dynamic molding zone at a temperature 25 to 35° F. below the setting point of the fat and so it requires merely time to accomplish the desired solidification. For this purpose, the molding zone provides a residence time of sufficient length to permit a titer heat rise of at least about 5° F., over the temperature of the product leaving the last chilling A-unit cylinder. Solidification of margarine in the molder, associated with an excessively great titer heat rise, may stop the intermittent flow of prints by reason of the frictional drag of the solid mass against the molder walls. To compensate in part for this, warm fluid may be kept in contact with the wall to maintain the contacting margarine liquefied while the remainder is solidified. In other words, the thin film of liquefied margarine between the wall and the solidified portion thereof serves as a lubricant for the moving mass of solid margarine. The temperature of the margarine leaving the molding zone is about 40 to 65° F. The temperature level is determined by the previous treatment of the margarine in the Votator assembly which in turn is determined by the character of the fat; the softer the fat (lower melting and setting points and higher iodine values) the greater the initial superchilling (lower temperature) and vice versa.

As mentioned earlier, fat crystallization with a titer heat rise in the temperature of the product continues as the product is wrapped, cartoned and packed. Final product temperature rises to about 50 to 80° F.

A preferred continuing operation involves the feeding of a quantity of margarine in excess of that handled by the packaging machine. This requires the addition of a return line to the churn in which there is the warm liquid margarine emulsion. The excess chilled margarine emulsion is passed through a heat exchanger so that remelted emulsion returns to the churn. The holdup in the recycle line may be used as surge capacity in place of the compensator previously described.

To provide a better understanding of our invention, reference will be had to the accompanying drawings in which is illustrated a specific embodiment thereof.

FIG. 1 is a schematic drawing of the process of this invention employing a single molding zone.

FIG. 2 is a schematic drawing of the process of this invention employing a two-unit molding zone.

FIG. 3 is a cross-section of FIG. 2 taken along the lines 3—3 of FIG. 2.

Reference will now be had to FIG. 1 in connection with the following description of the process of this invention employing a one-unit molding zone.

To 80.4 parts by weight of margarine fat having a melting point of 93.4° F., a setting point of 74.5° F. and an iodine value of 85.5 and having dissolved therein the customary vitamins, emulsifiers and perservatives, are added 17.6 parts by weight of flavored skim milk and 2 parts by weight of sodium chloride. This mixture is fed from a supply line 5 to a churn 6 in which is positioned a stirrer 7 for the purpose of obtaining homogeneous mixing. Recycled remelted margarine is also fed to the churn 6 by means of a return line 8. The temperature of the margarine in churn 6 is maintained at about 100–105° F. The liquid margarine is discharged from the bottom of churn 6 through line 10, and thereafter enters the suction side of a pump 11. By means of pump 11 the emulsion of margarine is pumped through line 12 and thence enters the first chilling A-unit cylinder 14. In unit 14 the emulsion under a pressure of about 300 p.s.i.g. is subjected to chilling for a period of about 4 seconds. Margarine leaves unit 14 though line 15 and enters the second A-unit cylinder 16, and then through line 17 into the third and last A-unit cylinder 18. The residence time in each cylinder is about 4 seconds. The throughput of these chilling units is about 6000 pounds per hour. The superchilled liquid margarine product at a temperature of 42–45° F., about 30° F. below the setting point of the fat, leaves the last unit 18 through line 20 and is now ready for molding.

In line 20 is positioned a cylinder-piston arrangement 21, which will hereafter be designated as a compensator. On the back side of the piston a gaseous pressure of about 100 p.s.i.g. is maintained. The gas employed for this purpose may be any inert material; however, nitrogen suits the purpose. The emulsion in the supply line 20 near the compensator is under about the same pressure as the compensator. The liquid margarine flows through line 20 into line 22, and then it enters a two-way valve 23. As shown in the drawing, the valve 23 is in a position to permit margarine to flow from line 20 to a metering zone, e.g. a piston-cylinder 25. The metering zone 25 consists of a cylinder 26 having positioned therein a piston 27. Although not shown, the piston is reciprocated in unison with the action of the valve 23. When the valve 23 is in the position to permit margarine to flow into the metering zone, the piston 27 is travelling upward so as to provide volume for the entering margarine. At the end of the cycle, the valve 23 turns clockwise and thus permits margarine to flow from the metering zone to the decomposition and molding zone 29. Also, at this time piston 27 is forced downward, thus propelling the margarine to flow as described.

In the molding zone 29 margarine flows from left to right in an intermittent fashion corresponding to the intermittent entrance of margarine from the metering zone. The margarine remains in the molder 29 for a period of about 3 seconds. At the end of this period, the solidified margarine is discharged from the molder and enters a recess (mold cavity) of a packaging unit 31. The reciprocating action of the recess cleaves the margarine to prints of desired size, and these are wrapped and placed on a conveyor system 32 and further packaged in accordance with conventional practices. Reference should now be had to FIGS. 2 and 3 which show a unit having two-molding zones, the operation of which is substantially the same as that described above in connection with FIG. 1. In these figures, parts corresponding to the same part in FIG. 1 have been marked with prime numbers. In the process disclosed in these figures, the emulsion in the supply line 20' near the compensator 21' is under about the same pressure as the compensator. The liquid margarine flows through line 20' into lines 22' and then it enters two-way valves 23'. As shown in the drawings, the valves 23' are in a position to permit margarine to flow from line 22' to metering zones, e.g. piston-cylinders 25'. The metering zones 25' consist of cylinders 26' having positioned therein pistons 27'. Although not shown, the pistons are reciprocated in unison with each other and with the action of the valves 23'. If desired, the pistons may be reciprocated alternatively so that the liquid margarine is fed to one of the two molding zones at a time. When the valves 23' are in the position to permit margarine to flow into the metering zones, the pistons 27' are travelling away from the valves 23' so as to provide volume for the entering margarine. At the end of the cycle, the valves 23' turn and thus permit margarine to flow from the metering zones to the decomposition and molding zones 29'. Also, at this time, pistons 27' are forced towards the valves 23', thus propelling the margarine to flow as described.

Referring to line 20, it will be noted that it branches into line 22 and recycle line 8. Recycling of margarine is practiced to insure at all times sufficient output for molding and packaging. Liquid margarine being recycled through line 8 enters a heat exchanger 35 before entering churn 6. In the heat exchanger the temperature is raised from about 44° to about 100° F., thus insuring complete liquefaction. One Votator assembly as described above feeds two packaging lines, each producing 2580 pounds of packaged margarine per hour. Thus, the recycled margarine amounts to about 14% of that processed through the series of Votator A-unit cylinders.

The temperature of the superchilled material shows a progressive increase after leaving the Votator assembly. The superchilled product is initially at 42 to 45° F.; this increases immediately as fat crystallization progresses. Thus, the product leaving the molder is at 50 to 55° F., at 55 to 60° F. during cartoning, and finally at 58 to 62° F. after packing in the shipping case. The overall temperature rise of the product is about 16 to 18° F. due to dissipation of titer heat.

The final product is initially uniform and smooth in texture and hence requires no tempering. Margarine made by the conventional process is beady in character, comprising hard margarine particles dispersed in very soft (worked) margarine. Only by tempering for about 48 hours at room temperature and then rechilling can the beady character of the conventional margarine be eliminated. This tempering step has an inherent disadvantage besides contributing to manufacturing costs. The crystallized fat in chilled margarine undergoes polymorphic changes until the stable crystalline form is obtained. This form melts at an appreciably higher melting point with the result that tempered margarine melts noticeably less readily in the mouth. During continuous refrigeration storage, possible only with the margarine of the present invention, it is possible to retain the quick-melt-in-the-mouth feature of the freshly produced product. The margarine of the present invention also is free of air pockets and this is reflected by specific gravity measurements. The new margarine has a specific gravity equal to that of the liquid margarine emulsion, 0.96 in the case of the product described in the example above, whereas conventional margarine of the prior art has a measureably lower specific gravity, 0.89 to 0.92 in the case of conventional margarine made with the same formulation described in the example above. Air pockets are undesirable since they contribute to the flavor instability of the margarine, provide favorable conditions for microbiological spoilage, and are responsible for fracturing of the margarine when patties are cut. Since the margarine of the present invention sets up directly from the liquid to final print form, strong cohesive forces within the print result. This is in contrast to that noted with conventional margarine already set prior to molding. The latter product depends simply upon pressure to hold the solid margarine pieces together following molding. As a result of this, adhesive forces responsible for margarine sticking to the wrapper can exceed cohesive forces within the print, so that such conventional margarine will exhibit pieces sticking to the wrapper and a pocketed surface appearance when the wrapper is removed. The margarine of the present invention, on the other hand, strips clean from the wrapper, leaving a smooth uniform surface on the print. This factor of strong cohesive forces within the margarine of the present invention also contributes to the ease with which patties can be cut without fracturing.

Having thus provided a description of our invention along with specific examples, it should be understood that it is defined by the appended claims.

We claim:
1. A process for the manufacture of margarine sub- stantially free from occluded air which comprises passing continually a predetermined quantity of superchilled liquid margarine emulsion to an elongated solidification and heated molding zone having the cross-sectional area of the final print, the predetermined quantity of liquid margarine corresponding substantially to the volume of the final print, the liquid margarine solidifying to a block of margarine having the cross-sectional area of the final print within the molding zone, intermittently feeding a predetermined quantity of liquid margarine to the molding zone such that a portion of the solidified margarine corresponding to the final print size is discharged intermittently therefrom, and subdividing the solidifying margarine to final print size as it is being discharged from the molding zone.

2. The process of claim 1 wherein superchilled liquid margarine emulsion is passed to a metering zone of a volume corresponding to the final print size prior to flowing to the solidification and molding zone.

3. A process for the manufacture of margarine substantially free from occluded air which comprises passing a continuous stream of superchilled liquid margarine emulsion to a metering zone having a volume corresponding substantially to the final print size of solidified margarine, passing the metered liquid margarine to two elongated solidification and heated molding zones each having a cross-sectional area of the final print, the liquid margarine being solidified within the heated molding zone, discharging intermittently from each of said heated molding zones a portion of solidified margarine corresponding to the final print size, and subdividing the discharged margarine as fast as it is discharged from each molding zone to obtain the final prints.

4. The process of claim 1 wherein the margarine contains a fat ingredient having a melting point of about 90° to 105° F.

5. The process of claim 3 wherein the margarine contains a fat ingredient having a melting point of about 90° to 105° F.

6. A process for the manufacture of margarine substantially free from occluded air which comprises passing a super-chilled liquid margarine emulsion to a metering zone having a volume corresponding substantially to the final margarine print size, intermittently passing a predetermined quantity of liquid margarine emulsion corresponding substantially to the volume of the final print size from said metering zone to a heated elongated solidification and molding zone having the cross-sectional area of the final print, said liquid margarine emulsion solidifying to a block of margarine having the cross-sectional area of the final print within the molding zone, intermittently discharging a portion of the solidifying margarine corresponding to the final print size from the molding zone to an enclosed cleaving zone and subdividing the solidifying margarine in said cleaving zone to final print size.

7. A process for the manufacture of margarine substantially free from occluded air which comprises passing a super-chilled liquid margarine emulsion from a chilling zone to a metering zone, intermittently passing a predetermined quantity of margarine emulsion corresponding substantially to the volume of the final print from said metering zone to a heated elongated solidification and molding zone having the cross-sectional area of the final print, said liquid margarine solidifying to a block of margarine having the cross-sectional area of the final print within the molding zone, passing said super-chilled margarine emulsion to a surge zone when the intermittent flow of margarine emulsion to the molding zone is stopped, intermittently discharging a portion of the solidifying margarine corresponding to the final print size from the molding zone to an enclosed cleaving zone wherein the solidifying margarine is subdivided to final print size.

8. A process for the manufacture of margarine substantially free from occluded air which comprises passing a super-chilled liquid margarine emulsion from a chilling zone to a metering zone, intermittently passing a predetermined quantity of margarine emulsion corresponding substantially to the volume of the final print from said metering zone to a heated elongated solidification and molding zone having the cross-sectional area of the final print, said liquid margarine solidifying to a block of margarine having the cross-sectional area of the final print within the molding zone, passing said super-chilled margarine emulsion to a surge zone when the flow of margarine emulsion to the metering zone is stopped, combining the margarine in said surge zone with the super-chilled liquid margarine emulsion flowing to said metering zone when said metering zone is being charged, intermittently discharging a portion of the solidifying margarine corresponding to the final print size from the molding zone to an enclosed cleaving zone wherein the solidifying margarine is subdivided to final print size.

References Cited in the file of this patent

UNITED STATES PATENTS

| | | |
|---|---|---|
| 2,330,986 | Miller et al. | Oct. 5, 1943 |
| 2,339,883 | Schaub | Jan. 25, 1944 |
| 2,683,932 | Steenhuis | July 20, 1954 |
| 2,745,750 | Shafer et al. | May 15, 1956 |
| 2,797,164 | McGowan et al. | June 25, 1957 |